United States Patent [19]

Goldenberg

[11] 3,865,689
[45] Feb. 11, 1975

[54] METHOD OF PRODUCING CARCINOEMBRYONIC ANTIGENS

[75] Inventor: David Milton Goldenberg, Lexington, Ky.

[73] Assignee: Hoffmann-La Roche Inc., Nutley, N.J.

[22] Filed: Nov. 9, 1972

[21] Appl. No.: 305,197

[52] U.S. Cl. ................................................ 195/1.7
[51] Int. Cl. .............................................. C12k 9/00
[58] Field of Search ........................... 195/1.1–1.8,

[56] References Cited
OTHER PUBLICATIONS

Goldenberg et al., Science, Vol. 175, pp. 1117–1118, Mar. 1972. Experimental Cell Research, Vol. 42, pages 157–170, 1966.

Primary Examiner—Richard L. Huff
Attorney, Agent, or Firm—Samuel L. Welt; Jon S. Saxe; Gerald S. Rosen

[57] ABSTRACT

A method of cultivating carcinoembryonic antigen producing cells in vitro in a highly supplemented growth medium is disclosed.

3 Claims, No Drawings

3,865,689

METHOD OF PRODUCING CARCINOEMBRYONIC ANTIGENS

BACKGROUND OF THE INVENTION

Carcinoembryonic antigen (CEA), an antigenic material which aids in the diagnosis of carcinoma and other neoplasms is difficult to isolate from tumor cells. Furthermore, the antigen or its antigenically active components, at present, can only be isolated from tumor cells obtained directly from humans.

It is therefore desirable to devise a method wherein the tumor cells which produce CEA can be propagated and cultivated in vitro in order to assure a continuing supply of CEA without dependence upon humans as a source.

DETAILED DESCRIPTION OF THE INVENTION

This invention relates to a process of utilizing human gastrointestinal neoplasms, preferably colonic carcinomas, transplanted in laboratory animals to establish serially propagable cell lines which produce carcinoembryonic antigen. The laboratory animals which have been found to be most suitable are hamsters. Therefore, this invention will be described utilizing hamsters.

Primary tumors are very difficult to propagate and grow in nutrient culture media. Therefore, for purposes of this invention, transplanted tumors from primary tumors are preferred.

It has been found specifically that some human CEA producing tumors are transplantable to the cheek pounch and other body sites of hamsters where they can be maintained in a viable form for long periods of time, e.g., several months. These tumors not only grow and propagate continuously, but also maintain their production of tumor-associated substances, i.e., CEA, in the animal host while at the same time retaining other characteristics of their human origin. The process used to propagate these tumors in hamsters and to demonstrate their production of CEA is that described by Goldenberg and Hansen in Science 175 1117–1118 (1972).

According to this invention the CEA producing tumors as described can be cultivated in a nutrient medium which contains sufficient nutrients to enable the cells to propagate and produce CEA materials. A suitable medium is that devised by Hutchison et al., Experimental Cell Research 42 157–170 (1966). This medium contains glucose, salt solutions, vitamins, amino acids, NCTC 109 medium, phenol red, antibiotics, calf serum, sodium bicarbonate and water in the proportions as follows:

TABLE I

| Isolation and Growth Medium | |
|---|---|
| Glucose (100 mg/ml) | 8 ml. |
| Salt Solution A[a] | 80 ml. |
| Salt Solution B[b] | 40 ml. |
| MEM vitamins (100 ×)[c] | 10 ml. |
| MEM essential amino acids (50 ×)[d] | 16 ml. |
| MEM non-essential amino acids (100 ×)[e] | 10 ml. |
| Hypoxanthine (0.5 mg/ml) | 20 ml. |
| NCTC 109[f] | 40 ml. |
| Phenol-red antibiotic mixture[g] | 10 ml. |
| Serum, calf | 150 ml. |
| $NaHCO_3$ | 1.7 g. |
| Glutamine (29.2 mg/ml) | 10 ml. |
| Water | to 1000 ml. |

[a] NaCl 74.0 mg/ml, KCl 2.85 mg/ml, $Na_2HPO_4.7H_2O$ 2.90 mg/ml, $KH_2PO_4$ 0.83 mg/ml.

TABLE I-Continued

[b] $MgSO_4.7H_2O$ 3.08 mg/ml, $CaCl_2.2H_2O$ 0.32 mg/ml.
[c] Microbiological Associates, Price List Jan. 1, 1971, Catalog No. 13–607F, page 17.
[d] Microbiological Associates, Price List Jan. 1, 1971, Catalog No. 13–606, page 17.
[e] Microbiological Associates, Price List Jan. 1, 1971, Catalog No. 13–1141, page 17.
[f] Microbiological Associates, Price List Jan. 1, 1971, Catalog No. 12–123, page 66.
[g] Penicillin G 630 mg, streptomycin sulfate 1000 mg, phenol-red solution 1% 5 ml., distilled water 95 ml.

While this medium is suitable as a growth medium to support the growth of various organisms and cells, other growth media have been found less desirable for the growth and propagation of tumor cells which produce CEA.

As used herein, carcinoembryonic antigen (CEA) includes all materials which have CEA antigenic activity as evidenced by immunological tests.

The production and release of CEA by the cells in the growth medium can be demonstrated by immunofluorescence or radioimmunoassay.

To prepare the tumor cells for growth in vitro, they are excised from the animal and then disaggregated by enzymatic, mechanical, or other means of disruption. Preferably, the tumor is first minced, then washed with a sterile salt solution, preferably Hank's balanced salt solution (pH 7.2), to remove cellular debris and red blood cells.

When utilizing enzymatic means to disrupt the cells, it has been found that the use of a proteolytic enzyme is satisfactory. Typical of such enzymes is protease type VI (Sigma Chemical Co., St. Louis, Missouri). More preferred, however, is to first incubate the cells with a mucin-digesting enzyme (e.g., neuraminidase) in order to assist the digestive activity of the proteolytic enzyme employed. This is accomplished by incubating the cells in a salt solution, preferably Gey's salt solution, containing the mucin-digesting enzyme which acts upon the mucin coating of the cells to make such cells more accessible to the action of the proteolytic enzyme.

Prior to subjecting the cells to the action of a proteolytic enzyme, the mucin-digesting enzyme is removed. This can be accomplished by washing with a salt solution, e.g., Gey's salt solution, and centrifugation. The pellet of cells remaining after centrifugation is then subjected to the action of a proteolytic enzyme in salt solution, e.g., Gey's salt solution.

After disaggregation of the cells by the proteolytic enzyme, the cells are prepared for culturing by filtering through sterile gauze, washing with the nutrient medium described supra and a salt solution, e.g., Hank's balanced salt solution, by centrifugation.

The thus prepared cells are incubated in the appropriate nutrient growth medium such as is described supra. The culture medium contains serum, preferably calf serum, antibacterial antibiotics, e.g., penicillin, streptomycin and the like, and/or fungicides, e.g., nystatin and the like in addition to the ingredients of Hutchison et al.

The carcinoembryonic antigen material can be isolated by the process described in U.S. Pat. No. 3,663,684.

The cells are incubated in the nutrient growth medium at a pH of from about 6.8 to 7.4 and at a temperature of about 35°C. to 38°C., preferably 37°C. The medium is maintained in a quiet undisturbed condition in order to permit the cells and cell clumps to attach to the surface of the culture container.

In a few days, usually three or four, a layer of fibroblasts which contains numerous clumps or tumor cells grows.

The tumor cells and tumor cell clumps usually detach from the fibroblast layer to float in the medium. These cells and cell clumps can be removed for subculturing in a fresh culture medium. The change to the fresh medium is made as frequently as the growth and metabolic conditions of the culture requires, usually about every 2 weeks is sufficient. The specific length of time between medium changes is not critical to the operation of the process as long as the changes are not so infrequent that the growth of the cells is adversely affected. A good criteria for determining when to change the medium is a change in pH which reflects the cultures metabolic activity. This change in pH is shown by a change in the color of the phenol-red indicator which is present in the medium.

After several months, the fibroblast layer of cells begins to die off and eventually a pure population of colonic tumor cells is obtained. Once this stage is reached, subcultures of pure populations of tumor cells can be established in fresh culture medium with no fibroblast layers. Such pure populations of tumor cells continue to produce CEA. Morphologically, the cells in the culture appear spheroidal in form and contain cytoplasmic granules, and prominent, often eccentric, nuclei.

The CEA produced by the cells is released into the culture medium. The CEA in the culture medium can be demonstrated and measured by radioimmunoassay, e.g., in the manner described in U.S. Pat. No. 3,663,684, or similar techniques described in the literature.

Another more direct method of demonstrating the presence of CEA is to demonstrate its presence in the in vitro cultivated colonic tumor cells. This is accomplished by removing the cells from the culture medium at various time intervals and subjecting them to an immunofluorescent test for CEA. The immunofluorescent test can be carried out either by direct means using an antibody to CEA conjugated with a fluorochrome, e.g., fluorescein isothiocyanate or by indirect means using an antibody to CEA and an antibody to the globulin of the species in which the antibody to CEA was produced, with the latter antibody conjugated with a fluorochrome, e.g., fluorescein isothiocyanate. The resulting fluorescence indicates the presence of CEA.

To prove that the cells are producing and releasing CEA, serial radioimmunoassays of aliquots of culture medium in which the cells are growing are performed from the same flask or bottle. The results show that the culture is steadily synthesizing and releasing CEA. When the entire culture medium is changed and a fresh amount of medium added, there is a drop in the CEA level of the replenished culture, because the CEA produced is likewise removed. However, as the cells multiply and continue to release CEA, there is a rise in the CEA titer in the medium. This amount of CEA released into the culture medium is thus dependent upon the density of the cell population. At the present time, CEA levels of as much as 1 microgram per ml. of culture medium have been obtained. However, the invention is not limited to the production of this level of CEA. No CEA was found in the culture medium containing no such tumor cells or in any media supporting the growth of other animal or xenografted human tumor cell lines.

The following examples illustrate the invention.

EXAMPLE 1

Growth of CEA-Producing Cells in the Hamster

A colonic carcinoma tumor specimen from a patient is grafted to hamsters by preparing a fine mince of the tumor, preferably by cutting with scissors or with scalpels and suspending the mince in a salt solution (e.g., 0.9 percent sodium chloride supplemented with 100 units per ml. of penicillin and/or 0.6 mg. per ml. of streptomycin), and then injecting aliquots therefrom into the cheek pouches of either weanling or adult hamsters. Corticosteroid-conditioning (e.g., 2.5 mg. cortisone acetate injected subcutaneously per animal twice weekly) or other conventional immunosuppressant measures can be instituted to support the growth of the tumors in the hamster, but such measures have been found to be unnecessary with some human colonic tumors. Thus, those designated in the laboratory as "GW-39" and "GW-77" grow in the hamster without the use of immunosuppressant measures. In any case, after growth of the initial transplants, tumor aliquots are again removed and prepared, as specified above, for retransplantation to other hamsters. Whereas the original heterotransplantation is preferred to the hamster cheek pouch site, subsequent grafts can be made to other regions (e.g., intramuscularly, subcutaneously, intracerebrally), from which viable and expansively-growing tumors can be obtained for continuous propagation. In the case of the tumor system with the laboratory designation GW-39, inoculation of a tumor suspension containing roughly 20–40 mg. of tumor tissue results in about 2–6 gram cheek pouch tumors 20–30 days later, or 100–150 gram tumors in the hind leg musculature 60–120 days after transplantation. Carcinoembryonic antigen can be extracted from these tumors by methods described in U.S. Pat. No. 3,663,684, and has been found in quantities of 100–200 micrograms per gram of tumor tissue.

EXAMPLE 2

Preparation of Cells for Growth in Culture Medium

A relatively small cheek pouch (7–14 days old) or intramuscular (14–30 days old) tumor is removed and very finely minced with a curved (iris) scissors. The mince is washed three times with Hank's balanced salt solution (HBSS, pH 7.2) in a 250 ml. beaker by adding 100 ml. of HBSS to the beaker with the mince, stirring by carefully rotating the beaker, allowing the mince to settle, and carefully decanting off the HBSS. The mince is then transferred to a 50 ml. centrifuge tube and washed by centrifugation with 50 ml. HBSS (1000 rpm for 5 min.). The HBSS supernatant is completely removed and the residual pellet is incubated for 60 min. at 37°C. in 10 ml. of Gey's saline containing 1.0 mg. of neuraminidase. The neuraminidase is then removed by centrifugation and the mince is again washed with Gey's salt solution by centrifugation. The supernatant is removed and the residual pellet is transferred to a trypsinzing flask and stirred for 45 min. at room temperature in 0.25 percent protease, in a ratio of 6.0 mg. pellet in 60 ml. protease solution. The resulting disaggregated cells are filtered through 2 layers of sterile gauze and washed once with the complete tissue culture medium described above and 4 times with HBSS by centrifugation. The supernatant is removed and the residual pellet is now ready for culturing.

EXAMPLE 3

Growth of CEA-Producing Cells in Culture

The pellet from Example 2 is suspended in the culture medium described above, in 150 cm$^2$ glass bottles and incubated at about 37°C. at a pH of from 6.8 to 7.4. The medium is maintained in an undisturbed condition allowing the individual cells and cell clumps to attach to the glass surface. In a few days a layer of fibroblasts grows out which contains numerous clumps of tumor cells. These fibroblasts [most likely derived from the cheek pouch (or muscle's) connective tissue] are not indigenous to the original human neoplasm. The clumps of tumor cells gradually increase in cell number, many of which are producing a mucinoid material. These tumor clumps eventually detach from the fibroblast layer and either continue to increase in cell number as "floaters" or reattach to the glass surface. As the number of cells increase, the medium becomes less able to support growth. This is manifested by the color change in the phenol-red indicator. At this time the medium containing the detached clumps is decanted into a 50 ml. centrifuge tube, spun at 1000 rpm for 5 min., and the residual pellet subcultured into a fresh glass bottle containing fresh medium under the same conditions as described herein. Medium changes are made in this manner every two weeks. After several months, the fibroblast layer of cells begins to die off and, eventually, a pure culture of colonic tumor cells is obtained.

EXAMPLE 4

Direct Immunofluorescent Test for CEA in Cultured Cells

Tumor cells are removed from a culture flask of Example 3 and the suspended cells washed and incubated with goat antibody to CEA conjugated with fluorescein isothiocyanate. A majority of the cells then examined with a fluorescence microscope show a membrane fluorescence around the cells, thus indicating the presence of CEA on the cell's surface.

EXAMPLE 5

Indirect Immunofluorescent Test for CEA in Cultured Cells

Tumor cells are removed from a culture flask of Example 3 and the suspended cells washed and incubated with rabbit antibody to CEA and goat anti-rabbit globulin conjugated with fluorescein isothiocyanate. A peripheral fluorescence similar to that in Example 4 is observed in the majority of cells examined with a fluorescence microscope. This further confirms the presence of CEA in the cultured tumor cells.

EXAMPLE 6

Negative Immunofluorescent Reaction in Other Cultured Cells Examined

If the anti-CEA antisera used in Examples 4 and 5 are adequately cross-adsorbed with human blood group O red blood cells, removing any species-specific antibody, then body the direct or indirect immunofluorescent test have failed to demonstrate the presence of CEA in a number of other cell lines being propagated in vitro, even in the same culture medium as used to support the growth of CEA-producing tumor cells derived from human tumor xenografts. Those which were tested in the manner of Examples 4 and 5 and failed to demonstrate the presence of CEA are a human choriocarcinoma originally grafted to the hamster cheek pouch and subsequently established in tissue culture, the HeLa-S3 cell line originally derived from a human cervical carcinoma, the hamster amelanotic melanoma of Fortner, A. Mel. No. 3, grown in cell culture, and the murine lymphatic leukemia, L1210, in continuous cell culture.

EXAMPLE 7

Radioimmunoassay of CEA Released by Tumor Cells in Culture Medium

A standard curve is set thusly: 10 ml. of ammonium acetate buffer 0.01 molar, pH 6.8 is added to five pairs of duplicate 20 ml. disposable test tubes numbered 1 to 10. 100 µl. of normal goat serum is added to all tubes. CEA standard is added in the following volumes:

| | |
|---|---|
| To tubes 1, 2 — | 0 |
| To tubes 3, 4 — | 2.5 ng. |
| To tubes 5, 6 — | 6.25 ng. |
| To tubes 7, 8 — | 12.5 ng. |
| To tubes 9, 10 — | 25 ng. |

To identified duplicate test tubes 10 ml. of ammonium acetate buffer, 0.01 molar, pH 6.8 is added. 100 µl. of tissue culture medium to be tested is added and mixed.

50 µl. of a 1–1000 dilution of goat antiserum is added to the standard curve tubes and the sample tube and mixed. The mixture is incubated for 30 minutes at 45°C. At the end of incubation, the equivalent of 3 ng. of $^{125}$I-CEA (ca 450,000 dpm) is added to all tubes and mixed. The mixture is incubated for 30 minutes at 45°C. At the end of incubation 5 ml. of zirconyl phosphate gel (pH 6.25) is added to all tubes which are stoppered and mixed. The tubes are centrifuged at 1000×g. for 5 minutes. The supernatant is poured off and the tops of the tubes blotted on paper towel. 10 ml. of 0.1 M ammonium acetate buffer pH 6.25 is added to each tube which is then stoppered. The pellet is resuspended and the suspension is centrifuged at 1000×g. for 5 minutes. The supernatant is poured off and the top of the tubes blotted on paper towel. The outsides of the tubes are washed and wiped and the tubes are counted in a γ-scintillation counter.

After completion of procedure a standard curve is plotted on linear graph paper and the CEA level in medium is determined.

When the titer of medium is higher than 200 ng/ml an aliquot of the medium is assayed.

For example, to the 10 ml. of ammonium acetate buffer are added 20 µl. of the high titer medium and 80 µl. of normal goat plasma. This is followed by the addition of antiserum and the test is run exactly as described above.

The addition of the normal goat serum is necessary to keep the volume and the tonicity constant.

EXAMPLE 8
Lack of CEA Released, as Measured by Radioimmunoassay, by other Cell Lines into this Culture Medium Fresh culture medium, as is used to support the growth of CEA-producing tumor cells, or this culture medium in which other tumor cells, such as murine lymphatic leukemia L1210, the human HeLa-S3 cell line, or the hamster amelanotic melanoma A. Mel. No. 3 cell line, are growing failed to show any CEA after being examined by the radioimmunoassay described in Example 7. Thus, CEA is neither present in the fresh culture medium itself, nor in a number of other cell lines capable of growing in this or other culture media.

EXAMPLE 9
Proof of CEA Synthesis in Vitro

Serial radioimmunoassays of aliquots of culture medium in which colonic carcinoma tumor cells are growing (e.g., GW-39 tumor cells) is performed from the same flask. In this way, a steadily increasing concentration of CEA released into the culture medium is demonstrated. Changing the culture medium then results in an abrupt drop in CEA concentration, followed by a gradual rise thereafter. In one series of determinations, CEA values of 65, 410, and 560 nanograms per ml. of culture medium were found at 2, 14, and 26 days post medium-change, respectively. Within 24 hours after changing the culture medium, a CEA concentration of 75 nanograms per ml. of culture medium, and more, has been measured, thus indicating that one culture bottle can produce about 3.75 micrograms of CEA within 1 day, depending upon the culture's cell density. In more populated cultures, a tenfold increase in CEA production and release is achieved. These increasing concentrations of CEA in the culture medium after each complete change of medium, and the increase in total CEA content with increase in the culture's cell number, demonstrate that this antigen is being produced and released by viable tumor cells.

What is claimed is:

1. A method for propagating, in vitro, cells which produce carcinoembryonic antigen comprising incubating transplanted carcinoembryonic antigen producing tumor cells in a nutrient medium containing glucose, salt solutions, vitamins, amino acids, phenol-red, antibiotics, calf serum and sodium bicarbonate and which supports the growth and propagation of said carcinoembryonic antigen producing tumor cells at a pH of from about 6.8 to 7.4 at a temperature of about 35° to 38°C. and isolating the carcinoembryonic antigen.

2. The method of claim 1 wherein the nutrient medium is composed of

| | |
|---|---|
| Glucose (100 mg/ml) | 8 ml. |
| Salt solution A$^a$ | 80 ml. |
| Salt solution B$^b$ | 40 ml. |
| MEM vitamins (100 ×) | 10 ml. |
| MEM essential amino acids (50 ×) | 16 ml. |
| MEM non-essential amino acids (100 ×) | 10 ml. |
| Hypoxanthine (0.5 mg/ml) | 20 ml. |
| NCTC 109 | 40 ml. |
| Phenol-red antibiotic mixture$^c$ | 10 ml. |
| Serum, calf | 150 ml. |
| NaHCO$_3$ | 1.7 g. |
| Glutamine (29.2 mg/ml) | 10 ml. |
| Water | to 1000 ml. |

$^a$NaCl 74.0 mg/ml., KCl 2.85 mg/ml, Na$_2$HPO$_4$.7H$_2$O 2.90 mg/ml, KH$_2$PO$_4$ 0.83 mg/ml.
$^b$MgSO$_4$.7H$_2$O 3.08 mg/ml, CaCl$_2$.2H$_2$O 0.32 mg/ml.
$^c$Penicillin G 630 mg, streptomycin sulfate 1000 mg, phenol-red solution 1% 5 ml, distilled water 95 ml.

3. The method of claim 1 wherein the tumor cells are human tumor cells transplanted into a hamster.

* * * * *